No. 618,586. Patented Jan. 31, 1899.
E. H. SAWIN & B. T. PUTNAM.
COUNTER CUTTING MACHINE.
(Application filed May 23, 1898.)
(No Model.) 7 Sheets—Sheet 1.
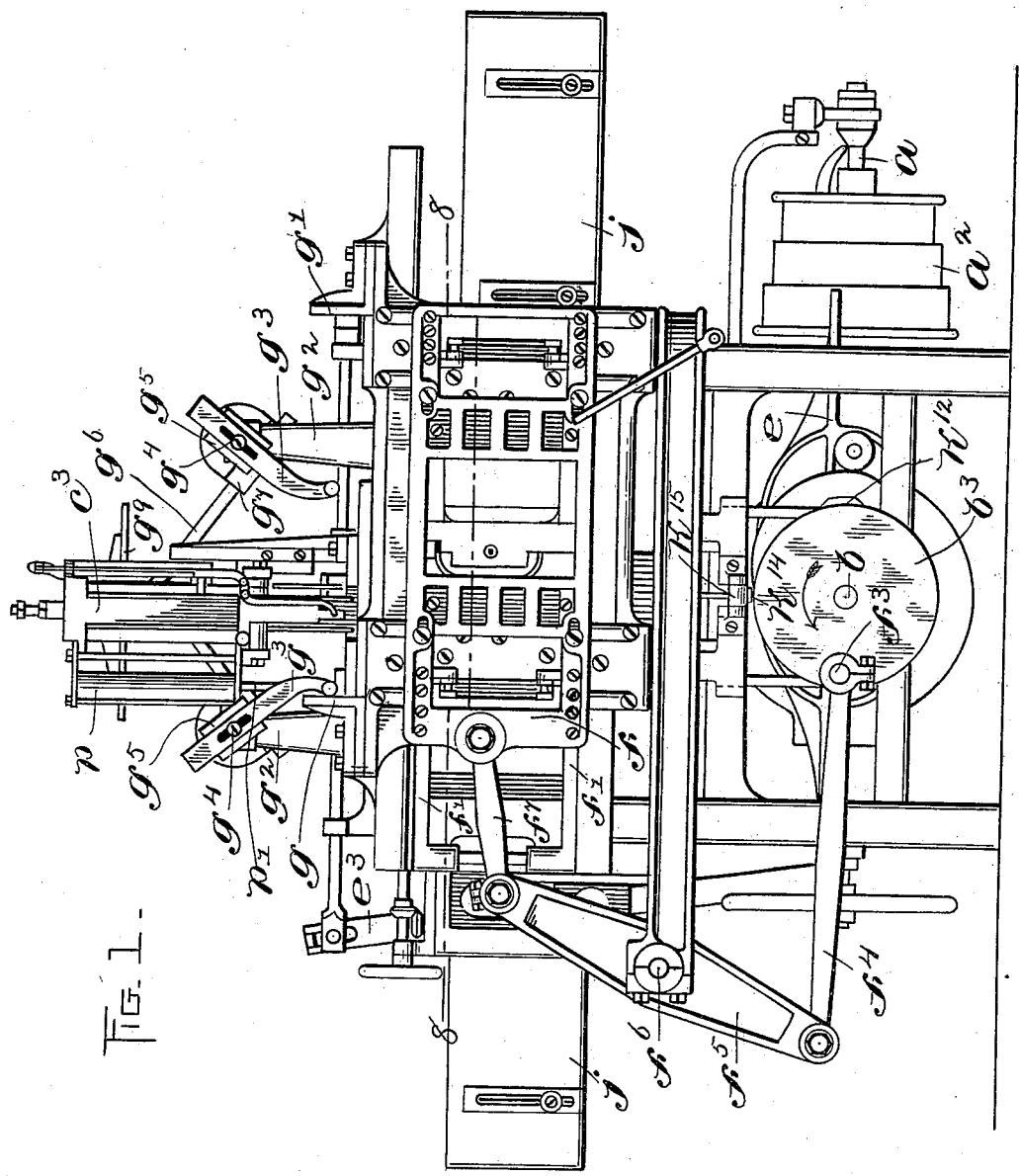

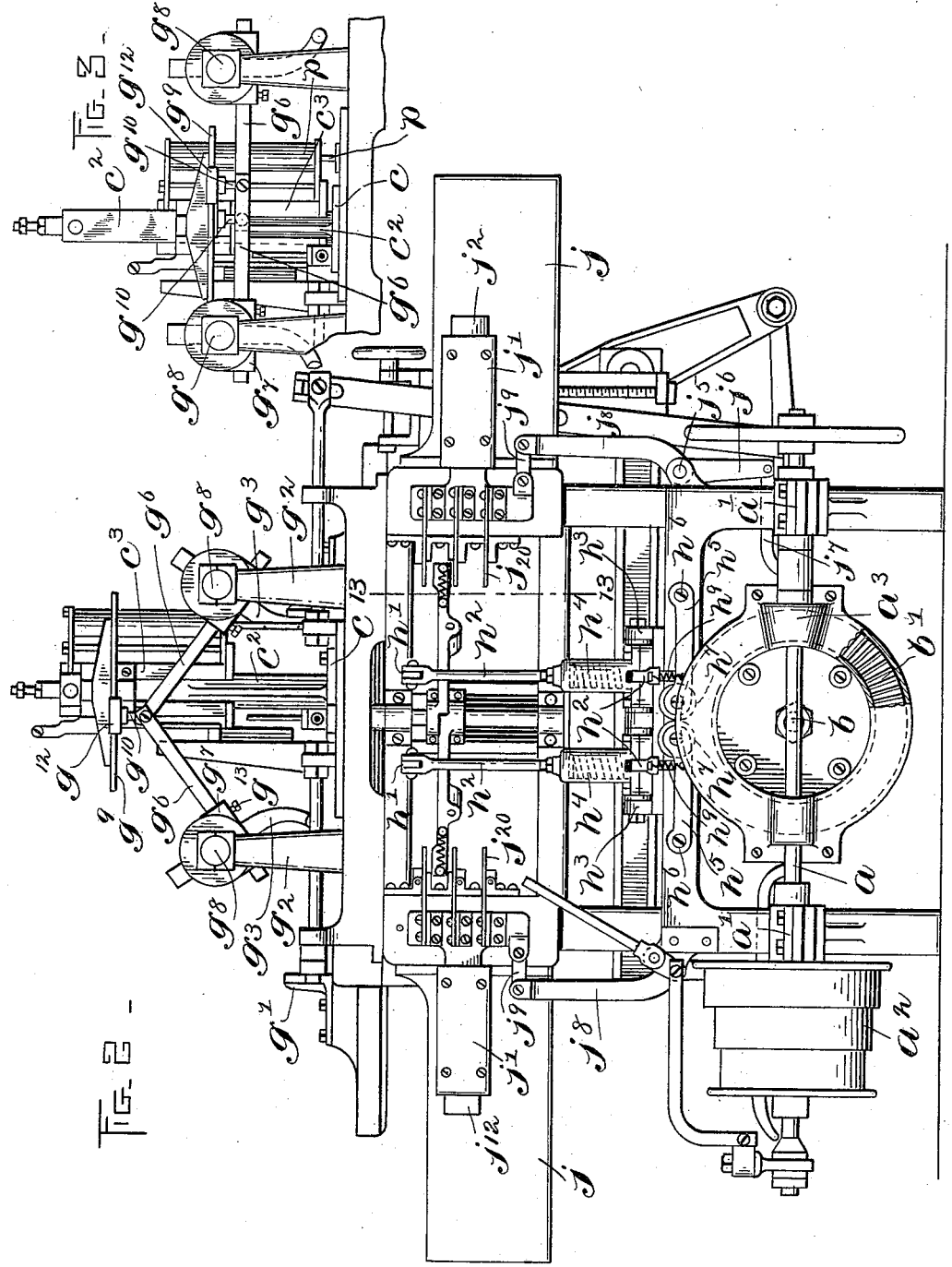

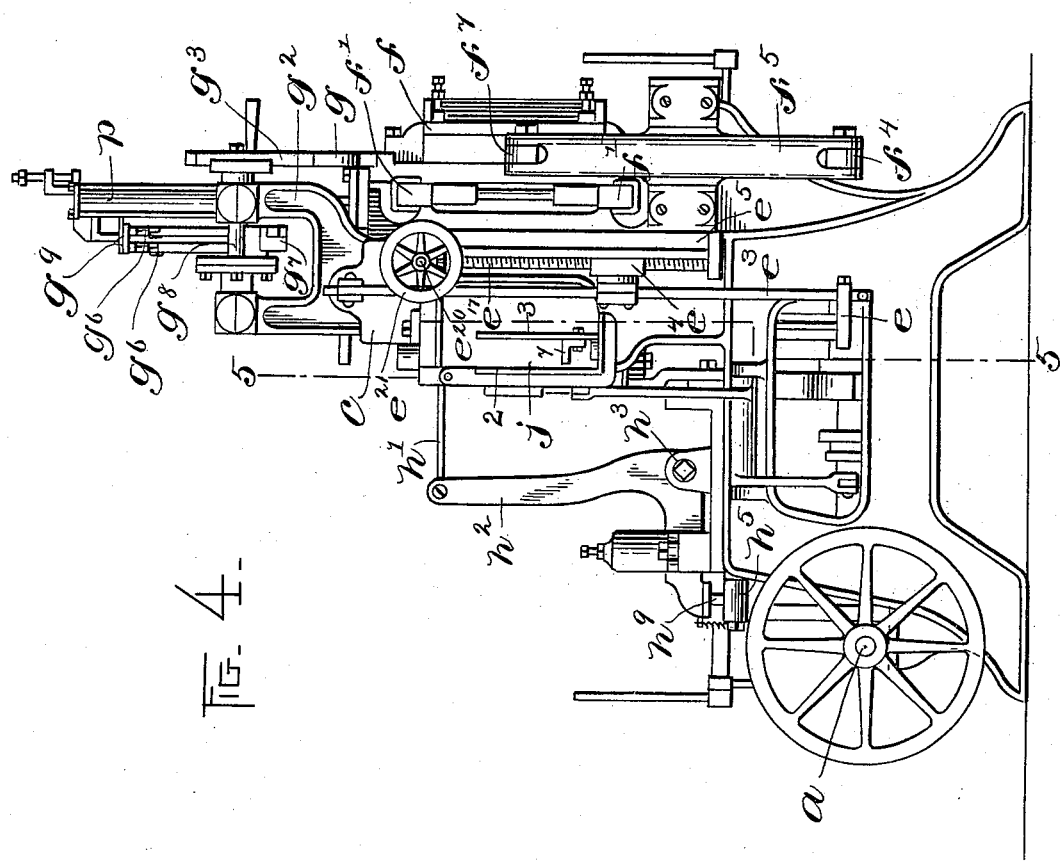

No. 618,586. Patented Jan. 31, 1899.
E. H. SAWIN & B. T. PUTNAM.
COUNTER CUTTING MACHINE.
(Application filed May 23, 1898.)
(No Model.) 7 Sheets—Sheet 4.
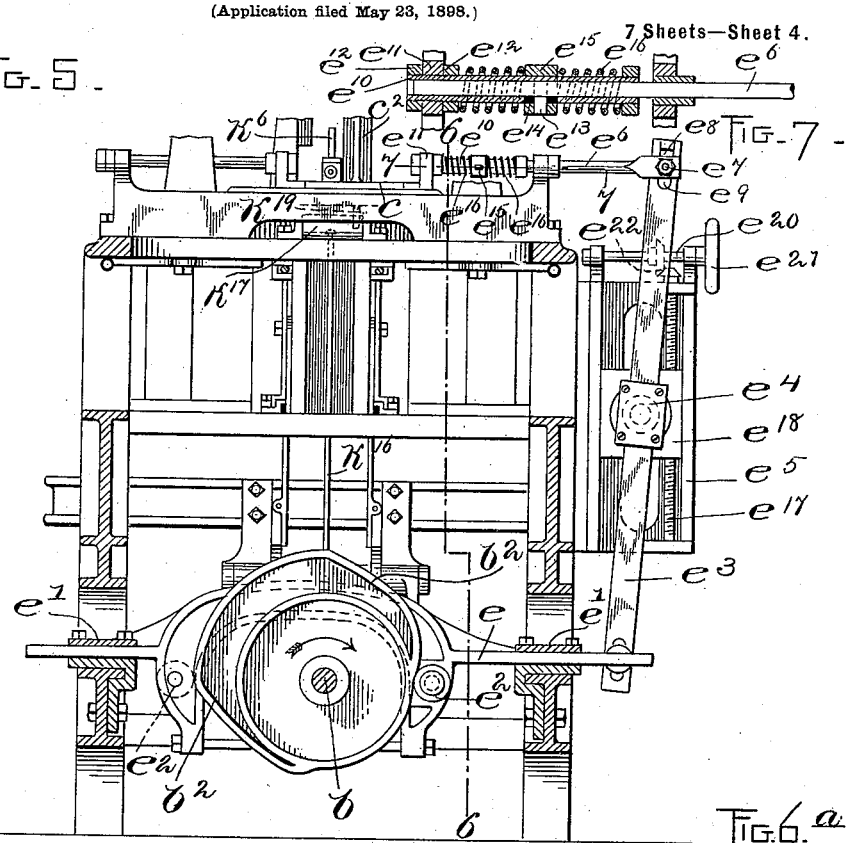
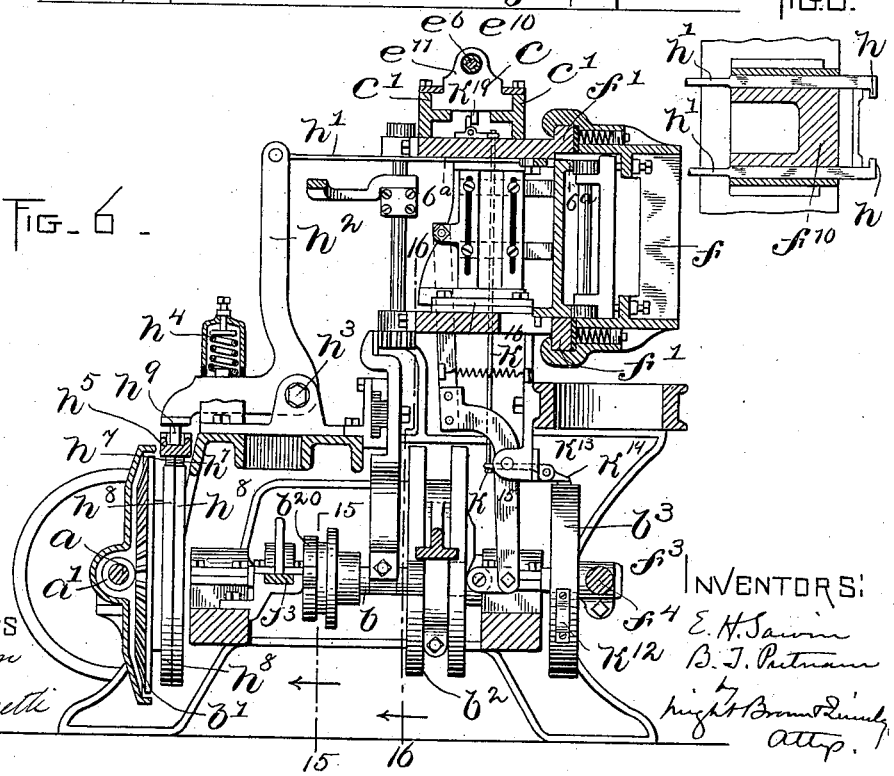

No. 618,586. Patented Jan. 31, 1899.
E. H. SAWIN & B. T. PUTNAM.
COUNTER CUTTING MACHINE.
(Application filed May 23, 1898.)
(No Model.) 7 Sheets—Sheet 5.
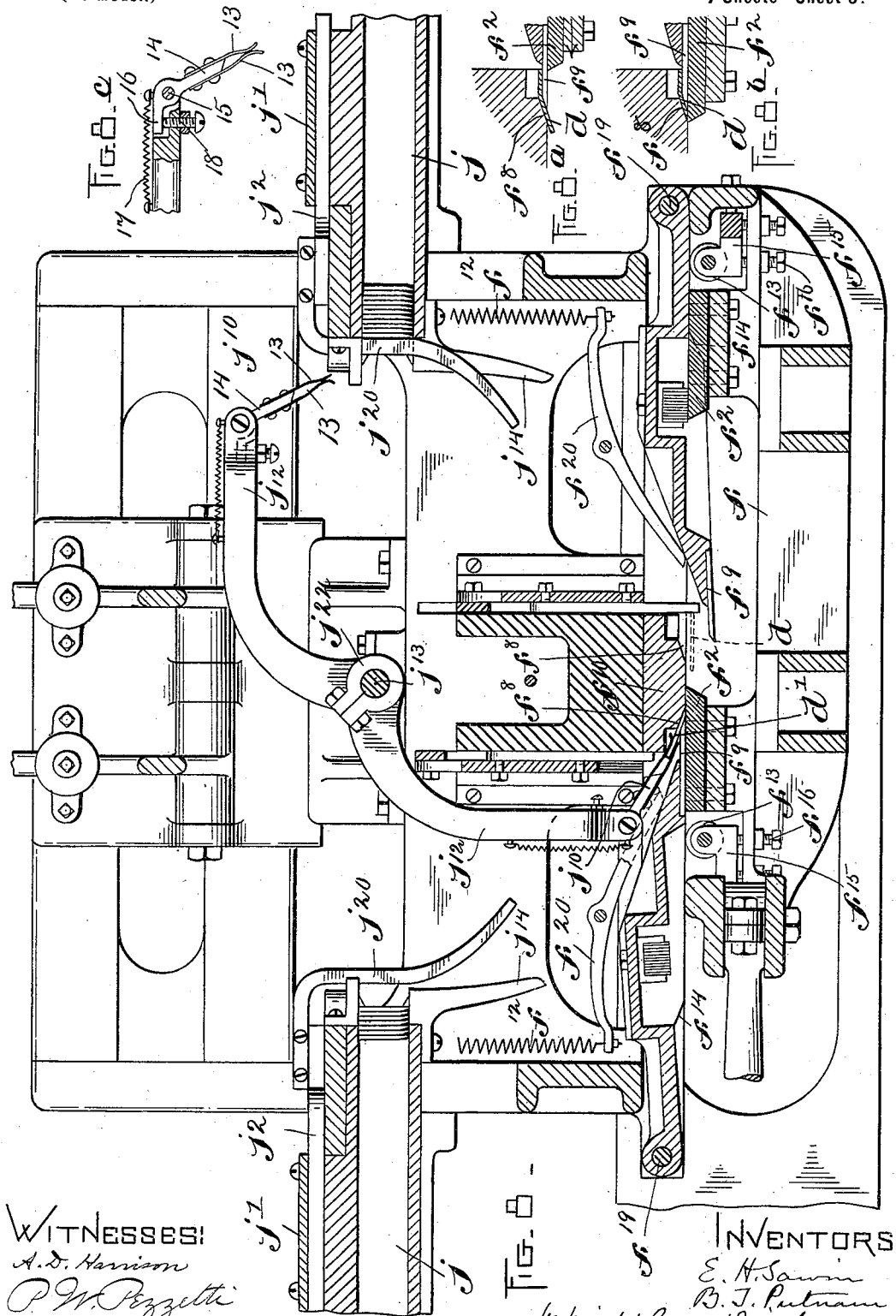
Witnesses:
A. D. Harrison
P. W. Pezzetti
Inventors
E. H. Sawin
B. T. Putnam
by Wright Brown & Quimby atty.s
THE NORRIS PETERS CO., PHOTO-LITHO., WASHINGTON, D. C.

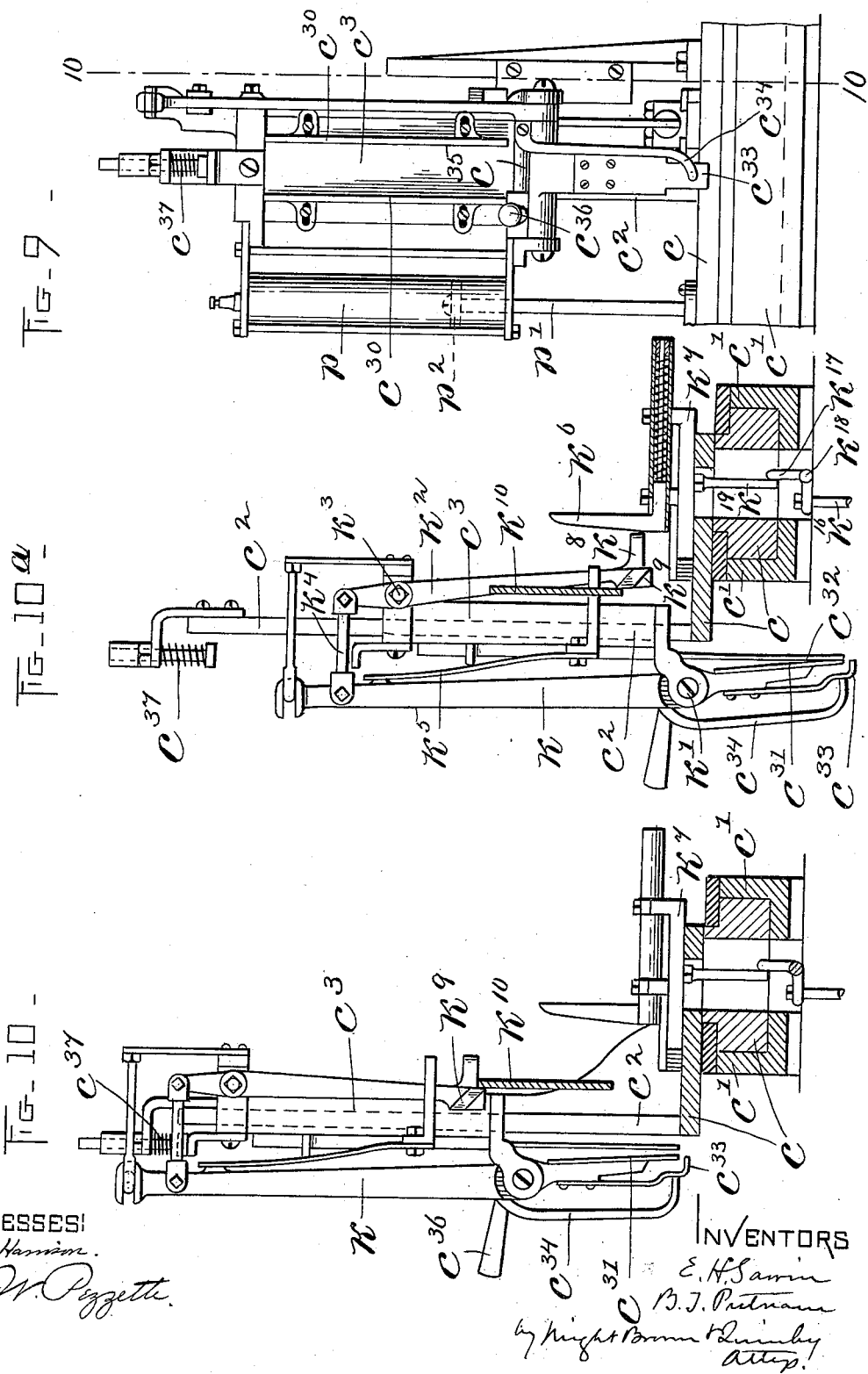

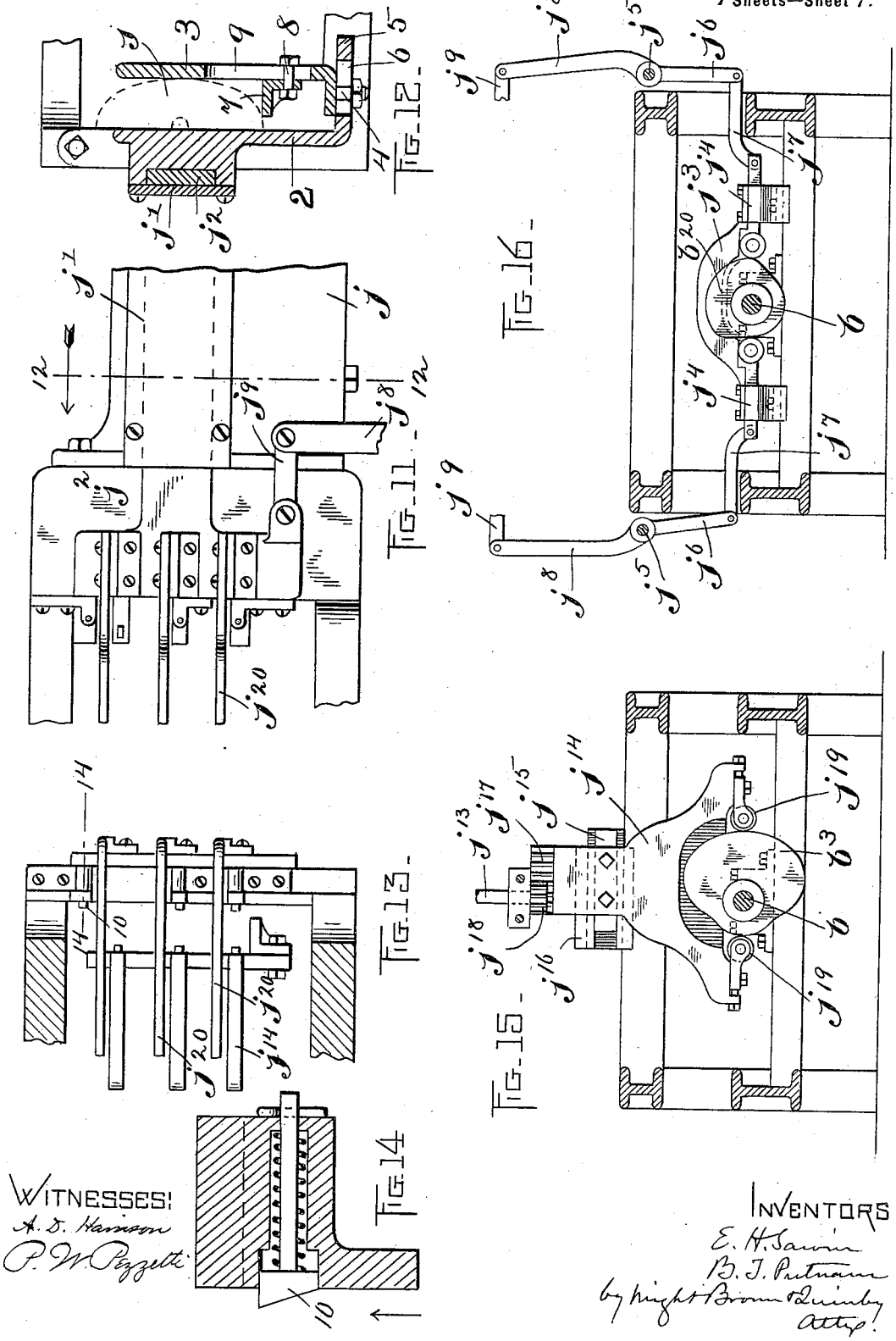

UNITED STATES PATENT OFFICE.

EDWARD H. SAWIN, OF GARDNER, AND BERTRAND T. PUTNAM, OF TOWNSEND, MASSACHUSETTS, ASSIGNORS TO THE SPAULDING BROTHERS COMPANY, OF TOWNSEND, MASSACHUSETTS.

COUNTER-CUTTING MACHINE.

SPECIFICATION forming part of Letters Patent No. 618,586, dated January 31, 1899.

Application filed May 23, 1898. Serial No. 681,424. (No model.)

*To all whom it may concern:*

Be it known that we, EDWARD H. SAWIN, of West Gardner, in the county of Worcester, and BERTRAND T. PUTNAM, of Townsend, in the county of Middlesex, State of Massachusetts, have invented certain new and useful Improvements in Counter-Cutting Machines, of which the following is a specification.

This invention relates to machines for producing skived counter-blanks wherein the blanks are cut by the machine from elongated strips supplied to the machine, the machine being provided with two fixed molds, pressers coöperating with said molds to press the counter-strips into the molds and hold them in a certain dished position, and a reciprocating knife-carrier having two skiving-knives which move across the molds and cut away the projecting portions of the dished strips, the machine also having a feed-slide, which is moved to present a strip first to one mold and knife and then to the other.

The invention has for its object to provide certain improvements in a machine of the character above outlined, having regard to the efficiency of the machine and to the adjustability of various parts of it, so that the same machine can be used to produce counters of various sizes and of various degrees of thickness.

The invention consists in the improvements which we will now proceed to describe and claim.

Of the accompanying drawings, forming a part of this specification, Figure 1 represents a front elevation of a counter-blank-forming machine embodying our invention. Fig. 2 represents a rear elevation of the same. Fig. 3 represents a view similar to a portion of Fig. 2, showing the feed-slide depressed. Fig. 4 represents an end elevation of the machine. Fig. 5 represents a section on line 5 5 of Fig. 4. Fig. 6 represents a section on line 6 6 of Fig. 5. Fig. $6^a$ represents a section on line $6^a$ $6^a$, Fig. 6. Fig. 7 represents a section on line 7 7 of Fig. 5. Fig. 8 represents a section on line 8 8 of Fig. 1. Figs. $8^a$, $8^b$, and $8^c$ represent details hereinafter referred to. Fig. 9 represents a front elevation of the feed-slide and its carrier, the slide being raised. Fig. 10 represents a section on line 10 10, Fig. 9. Fig. $10^a$ represents a view similar to Fig. 10, showing the feed-slide depressed. Fig. 11 represents a rear elevation of a portion of one of the feed-reservoirs and parts connected therewith. Fig. 12 represents a section on line 12 12, Fig. 11. Fig. 13 represents a section on line 13 13, Fig. 12. Fig. 14 represents a section on line 14 14, Fig. 13. Fig. 15 represents a section on line 15 15, Fig. 6. Fig. 16 represents a section on line 16 16, Fig. 6.

The same letters and numerals of reference indicate the same parts in all the figures.

In the drawings, $a$ represents the driving-shaft, journaled in bearings $a'$ in the frame of the machine and having a stepped pulley $a^2$, on which the driving-belt runs, the stepped pulley providing for variations of speed. To the driving-shaft is affixed a bevel-gear $a^3$, meshing with a bevel-gear $b'$ on the main operating-shaft $b$, which is arranged at right angles with the driving-shaft $a$ and has the various cams, eccentrics, &c., hereinafter described, for imparting motion to the various parts of the machine.

$c$, Figs. 6, 9, 10, and $10^a$, represents the carrier, movable horizontally between guides $c'$ $c'$ at the top of the frame and provided with a vertical guide-standard $c^2$, on which the feed-slide $c^3$ is vertically movable, said slide being provided with mechanism for guiding and alternately gripping and releasing the blank-strip $d$. (Shown in dotted lines in Fig. 8.) The carrier $c$ is reciprocated by means of two cams $b^2$ $b^2$, Fig. 5, on the main shaft $b$, a slide $e$, movable horizontally in guides $e'$ $e'$ on the frame and having rolls $e^2$, which are arranged to be acted upon alternately by said cams, so that the slide is reciprocated thereby, a lever $e^3$, mounted in an adjustable fulcrum-block $e^4$, which is supported by a bracket $e^5$ on the frame, and a rod $e^6$, pivoted at $e^7$ to a slide $e^8$, movable in a slot $e^9$ in the lever $e^3$ and connected with the carrier by a tube $e^{10}$, which passes through an ear $e^{11}$ on the carrier and is engaged therewith by nuts $e^{12}$, secured on the tube and bearing on opposite sides of said ear. The rod $e^6$ enters the tube $e^{10}$ and has a key $e^{13}$, Fig. 7, which is rigidly attached to the rod and projects therefrom through a slot $e^{14}$ in the tube. To the key is attached a sleeve $e^{15}$, which surrounds the tube $e^{10}$ and is movable independently thereon. Cushioning-springs $e^{16}$ $e^{16}$ are interposed between the sleeve $e^{15}$ and nuts affixed to the tube. The positive movements of the rod are imparted to the tube and carrier through said springs, which are sufficiently stiff to be unyielding excepting when there is an unusual obstruction to the movement of the carrier, when the cushioning-springs yield and prevent breakage of the parts of the machine which would otherwise be liable to breakage in the event of such obstruction.

The fulcrum-block $e^4$ is adapted to be moved up and down on the lever $e^3$ to vary the relative length of the arms and the extent of movement of the carrier $c$ by means of a screw $e^{17}$, journaled in the bracket $e^5$ and passing through a threaded orifice in a slide $e^{18}$. The fulcrum-block $e^4$ is pivoted to said slide and has a slot through which the lever $e^3$ passes. The screw $e^{17}$ may be rotated to adjust the slide by a shaft $e^{20}$, having a hand-wheel $e^{21}$, said shaft and screw having bevel-gears $e^{22}$, Fig. 5.

$f$ represents the knife-carriage, which is reciprocated horizontally on guides $f'$ $f'$ at the front of the machine and carries the two knives $f^2 f^2$, Fig. 8. Said carriage is reciprocated by means of a wrist-pin $f^3$, Fig. 1, on a disk $b^3$ on the main shaft $b$, a pitman $f^4$, connected with said wrist-pin, a lever $f^5$, fulcrumed at $f^6$ on the frame of the machine and connected at its lower end with the pitman $f^4$, and a rod $f^7$, connecting the upper end of the lever $f^5$ with the knife-carriage. The knives reciprocate over fixed molds $f^8$ $f^8$, Fig. 8, in a vertical face-plate $f^{10}$, affixed to the frame, said molds being arranged to alternately receive the blank-strip $d$ from the feed-slide, as hereinafter explained, the strip being pressed into the molds by oscillating presser-plates $f^9 f^9$, Fig. 8, which are hinged at $f^{19}$ to the face-plate $f^{10}$ and are normally swung outward by springs $f^{12} f^{12}$, acting on levers $f^{20} f^{20}$, into the paths of rolls $f^{13} f^{13}$ on the knife-carriage $f$. The pressers are provided with inclines $f^{14} f^{14}$, with which the rolls $f^{13} f^{13}$ come in contact to alternately force the presser-plates inward into the molds $f^8$ $f^8$ and cause them to bend the strip into the molds, as shown in Fig. 8$^a$, so that portions of the strip will project into the path of the knives $f^2$, the projecting portions being trimmed away, as shown in Fig. 8$^b$. The rolls $f^{13}$ are mounted in adjustable holders $f^{15}$, which are supported by screws $f^{16}$, the rolls being adjustable by means of these holders and screws to the thickness of the blank-strip.

The feed-slide $c^3$ is reciprocated vertically on its guide-standard by the following mechanism:

$g$ $g'$ are lugs affixed to the knife-carriage and projecting upwardly therefrom near the ends thereof.

$g^8$ $g^8$ are rock-shafts journaled in bearings in brackets $g^2$ $g^2$ affixed to the frame.

$g^3$ $g^3$ are slotted arms adjustably secured by bolts $g^4$ $g^4$, Fig. 1, to guides $g^5$ $g^5$, affixed to the outer ends of said rock-shafts, the arms $g^3$ $g^3$ projecting downwardly, so that the lower end of one is in the path of the lug $g'$.

$g^6$ $g^6$ are arms adjustably affixed to guide sleeves or collars $g^7$ $g^7$, secured to the rock-shafts $g^8 g^8$. Said arms project under a horizontal flange $g^9$, affixed to the feed-slide $c^3$, and are connected by rods $g^{10}$ $g^{10}$, pivoted to the outer ends of said arms, (see Figs. 2 and 3,) with slides $g^{12}$ $g^{12}$, which are movable on the flange $g^9$. The rock-shafts are turned alternately by the contact of the lugs $g$ $g'$ with the arms $g^3$ $g^3$, and are thus caused to raise the arms $g^6$ $g^6$, each of which, when raised, raises the feed-slide, the latter falling by its own weight when the acting rock-shaft is released. The longitudinal adjustability of the arms $g^6$ in the sleeves $g^7$ enables the operative length of said arms, and therefore the extent of upward movement imparted to the feed-slide $c^3$, to be varied. The arms $g^6$ may be secured at any desired adjustment by set-screws $g^{13}$, Figs. 2 and 3, or other suitable means.

A dash-pot $p$, Fig. 9, mounted on the feed-slide $c^3$, plays on a piston $p^2$, secured to a rod $p'$, affixed to the feed-carrier $c$, and retards the downward movement of the feed-slide, making said movement comparatively gradual and lessening the jar attending its stoppage.

$h$ $h$, Fig. 6$^a$, represent strip-holding jaws which bind the blank-strip against the face-plate $f^{10}$ after each downward movement of the feed-slide and prevent the strip from rising with the feed-slide during the upward movement of the latter. Said jaws are lugs or fingers formed on the outer ends of rods $h'$ $h'$, which are movable in guides in the frame, their inner ends being connected with the vertical arms of bell-crank levers $h^2$ $h^2$, which are pivoted to ears $h^3$ $h^3$ on the frame $a$, studs or projections $h^9$ on their horizontal arms being held by springs $h^4$ $h^4$ against levers $h^5$ $h^5$, which are pivoted at $h^6$ $h^6$ to the frame $a$ and have trundle-rolls $h^7 h^7$, arranged to be raised by cams $h^8$ $h^8$, Fig. 6, on the main shaft $b$. The springs $h^4$ $h^4$ act to retract the slides $h'$ $h'$ and press the jaws $h$ $h$ against the face-plate $f^{10}$ or against the blank-strip $d$, Fig. 8, interposed between it and one of the jaws. The cams $h^8$ act to project the slides $h'$ alternately, and thus force the jaws $h$ away from the face-plate, these movements being so timed that each jaw grasps the strip after it has been fed downward, holds it while the feed-slide is rising, and releases it while the feed-slide is descending. The jaws $h$ are useful only after the first feed movement of the strip and before the first counter is cut, because subsequently the strip is held after each feed movement by one or the other of the presser-plates $f^9$. The jaws act, however, after each feed movement in the manner described.

The feed-slide $c^3$ has vertical guides $c^{30}$ $c^{30}$, Fig. 9, against which the edges of the blank-strip bear, and a spring-pressed jaw or arm $c^{31}$, which normally holds the strip against a jaw $c^{32}$, affixed to the slide and projecting downwardly from its lower end. Said jaws grasp the strip when the slide is descending and insure the downward movement of the strip with the slide. The jaw $c^{31}$ is pressed inwardly toward the jaw $c^{32}$ by the devices shown in Figs. 9, 10, and 10$^a$, and comprising a lever $k$, pivoted at $k'$ to the feed-slide $c^3$ and having the jaw $c^{31}$ affixed to its shorter arm, a lever $k^2$, pivoted at $k^3$ to the slide $c^3$ and connected at its upper end with the lever $k$ by a rod $k^4$, and a spring $k^5$, attached at one end to the slide $c^3$ and bearing at its other end against the lever $k$. Said spring normally presses the jaw $c^{31}$ toward the jaw $c^{32}$ and causes said jaws to grasp and hold the strip during the downward movement of the feed-slide. Just before the feed-slide rises the lower end of the lever $k^2$ is pressed forward to displace the lever $k$ and its jaw $c^{31}$ and cause the release of the strip by an arm $k^6$, mounted on a slide $k^7$ and arranged to strike a lug $k^8$ on the lever $k^2$ and force the lower end of the latter forward and hold it until the inclined face of another lug $k^9$ on said lever strikes the lower end of a fixed guide-plate $k^{10}$, the upward movement of the feed-slide causing the lug to move along the outer face of said guide-plate, as shown in Fig. 10$^a$. The guide-plate through the levers $k^2$ and $k$ holds the jaw $c^{31}$ in its displaced position. When the feed-slide reaches the end of its upward movement, the lug $k^9$ springs backwardly over the upper end of the guide-plate and the jaw $c^{31}$ again grasps the strip, the lug $k^9$ moving down along the back side of the guide-plate. The arm $k^6$ is operated by means of a cam $k^{12}$, Figs. 1 and 6, on the disk $b^3$ on the main shaft, a rock-shaft $k^{13}$, having an arm $k^{14}$, arranged to be displaced by said cam, and an arm $k^{15}$, projecting rearwardly, a vertical rod $k^{16}$, secured to the arm $k^{15}$, and a bell-crank lever $k^{17}$, pivoted at $k^{18}$ to the frame $a$ and having one arm engaged with the rod $k^{16}$ and the other with a stud $k^{19}$ on the slide $k^7$. The vertical arm of the bell-crank lever $k^{13}$ is made of considerable width, as shown in Fig. 5, so that it will engage the stud $k^{19}$ in any position the latter may be caused to occupy by the movements of the carrier $c$.

$c^{33}$ represents a spring gage-finger attached to the lever $k$ and adapted to be pressed under the jaw $c^{31}$ to form a stop for the lower end of the blank-strip when the latter is inserted in the machine by the operator, thus determining the position of said lower end. The gage-finger $c^{33}$ normally assumes the inoperative position shown in Fig. 10 by its own resilience and is pressed inwardly when desired by the operator by means of an arm $c^{34}$, bearing against the finger and attached to a rock-shaft $c^{35}$, Fig. 9, journaled in bearings on the feed-slide $a$. The rock-shaft has a handle $c^{36}$, which is grasped by the operator and depressed to cause the arm $c^{34}$ to spring the gage-finger $c^{33}$ inwardly.

$c^{37}$ represents a spring-buffer at the upper end of the guide $c^2$ and adapted to yieldingly arrest the upward movement of the feed-slide.

$j\ j$ represent two boxes at opposite ends of the frame of the machine to receive the counter-blanks formed by the described mechanism. Each counter-box $j$ is here shown as composed of a side piece 2, Fig. 12, attached rigidly to the frame of the machine, and a side piece 3, adjustably secured by bolts 4 to the fixed side piece, the latter having a flange 5, containing slots 6, through which the bolts 4 pass. This construction provides for the adjustment of the width of the counter-box, so that it can accommodate blanks of various widths. To vary the depth of the box, and thus adapt it to blanks of different lengths, the blanks being placed vertically in the box, as shown by dotted lines in Fig. 12, we provide an adjustable bottom 7, secured to the side piece 3 by bolts 8, passing through vertical slots 9 in said side piece, the slots and bolts permitting a vertical adjustment of the bottom 7.

At the mouth of each counter-box $j$ is a series of spring-latches 10, Fig. 14, each having a beveled outer face arranged to yield to the blanks as they enter the box in the direction indicated by the arrow in Fig. 14, the latches springing out and preventing the blanks from backing out of the box after they have passed the latches. On the rear sides of said boxes are guides $j'\ j'$, in which slides $j^2\ j^2$ are horizontally movable. To each slide is affixed a series of curved fingers $j^{20}$, projecting across the inner ends of the reservoirs. The slides and fingers are reciprocated in unison by means of a cam $b^2$, Fig. 16, on the shaft $b$, a yoke $j^3$, embracing said cam and movable in guides $j^4\ j^4$ on the frame of the machine, rock-shafts $j^5\ j^5$, journaled in ears on the frame and having downwardly-projecting arms $j^6\ j^6$, which are connected by links $j^7\ j^7$ with the yoke $j^3$, and upwardly-projecting arms $j^8\ j^8$, connected by links $j^9\ j^9$ with the slides $j^2\ j^2$. $j^{10}\ j^{10}$ represent pickers which are mounted on horizontal arms $j^{12}\ j^{12}$, affixed to a vertical rock-shaft $j^{13}$, journaled in bearings on the frame. Said shaft is oscillated by the means shown in Fig. 15, and comprising a yoke $j^{14}$, affixed to a slide $j^{15}$, which is movable in a fixed guide $j^{16}$, a rack $j^{17}$ on said yoke, meshing with a pinion $j^{18}$ on the rock-shaft $j^{13}$, and a cam $b^3$ on the shaft $b$, located between rolls $j^{19}\ j^{19}$ on the yoke $j^{14}$. The pickers are carried alternately toward and from the molds $f^8$ by the oscillating movements of the rock-shaft, one picker moving inwardly to grasp a counter in one die while the other is moving outwardly to transfer a counter from the other die to the corresponding reservoir. The movements of the fingers $j^{20}$ are timed so that when each picker reaches the mouth of the corresponding reservoir the set of fingers at that side moves outwardly and presses the counter into that reservoir, the counter being detached from the picker at the proper point by fixed fingers $j^{24}$ $j^{24}$, between which the picker passes.

Means are provided for adjusting the pickers, as follows: The arms $j^{12}$ are formed on a split collar or hub $j^{22}$, Fig. 8, which can be loosened to turn the arms on the rock-shaft and tightened to secure the arms at any desired adjustment. Each picker is composed of two spring-fingers 13 13, attached to a rigid finger 14, which is pivoted at 15 to one of the arms $j^{12}$ and has an arm 16, which is held by a spring 17 against a stop-screw 18. (See Fig. 8ᶜ.) By adjusting the screw 18 the fingers 13 13 can be caused to project at any desired angle from the arms $j^{12}$.

We claim—

1. In a machine of the character specified, the combination with the feed-slide carrier and the main shaft, of a lever oscillated by said shaft and connected with the carrier to reciprocate the same, an adjustable fulcrum for said lever, and means for adjusting said fulcrum, whereby the length of movement of the carrier may be varied.

2. The combination of the reciprocating feed-slide carrier, means for adjusting the throw of the same, and operating mechanism for said carrier, having cushioning-springs.

3. The combination with the feed-slide carrier and the main shaft, of a lever oscillated by said shaft and fulcrumed on the frame of the machine, a rod connected with the carrier, and elastic or yielding connections between the rod and carrier, whereby breakage of parts is prevented in case of unusual obstruction, and whereby the movements of the carrier are cushioned.

4. The combination with the feed-slide carrier, the shaft $b$, and the intermediate lever $e^3$, of the rod $e^6$ engaged with the lever, the tube secured to the carrier, a key affixed to the rod and projecting through a slot in the tube, a collar affixed to the key and surrounding the tube, but movable with the rod independently of the tube, adjustable abutments secured to the tube at opposite sides of said collar, and springs interposed between the collar and adjustable abutments.

5. The combination with the feed-slide and the reciprocating knife-carriage, of connections between said parts for vertically reciprocating the feed-slide, said connections comprising the rock-shafts arranged to be turned alternately by movements of the carriage and provided with guide sleeves or collars $g^7$, arms $g^6$ adjustably secured to said guide-sleeves, means for holding said arms at any desired operative length, and sliding connections between the outer ends of said arms and the feed-box.

6. The combination with the strip feeding and cutting mechanism and the main shaft, of the strip-holding jaws $h$ $h$, the sliding rods carrying said jaws, the bell-crank levers connected with said rods, cams on the main shaft arranged to move said levers, rods, and jaws alternately to displace the jaws, and springs acting on said levers to normally hold the jaws in their operating positions.

7. The combination with the feed-slide, the main shaft, and slide-operating mechanism operated thereby, of the spring-pressed strip-holding jaw $c^{31}$ on said slide, the finger-displacing lever $k^2$ having an inclined or beveled lug $k^9$, the fixed guide-plate arranged to coöperate with said lug in holding the finger displaced during the upward movement of the slide, the lever-displacing arm $k^6$, a cam on the driving-shaft, and connections substantially as described, between said cam and arm, whereby the arm is operated.

8. The combination with the two counter-cutting mechanisms and the two counter-reservoirs, of a rock-shaft having two arms, pickers on said arms arranged to take the counters alternately from the two cutting mechanisms, means for oscillating the rock-shaft and pickers, and the reciprocating packers coöperating with said pickers, substantially as described.

9. The combination of the feed-slide having the spring-pressed strip-grasping jaw, the main shaft, and mechanism for displacing and releasing said jaw, said mechanism comprising a cam on the main shaft, a lever fulcrumed on the frame of the machine and having an arm projecting into the path of said cam, a lever pivoted to the feed-slide, connections between said lever and the strip-holding finger, a slide movable on the frame of the machine, and connections between said slide and the cam-operated lever, whereby the slide is reciprocated to intermittently displace the strip-grasping finger, said connections having provisions such as the wide-armed bell-crank lever $k^{17}$ for the operation of the slide in either position of the feed-slide.

10. The combination with the pickers and the packing devices, of the counter-boxes having spring-latches adapted to retain the counters inserted in the boxes.

11. The counter-boxes adjustable laterally to the width of the counters and also adjustable in depth to the length of the counters.

12. The combination with the adjustable counter-boxes and the adjustable packers, of the pickers, the rock-shaft carrying the pickers, and means for adjusting the pickers.

13. The feed-box having a stop or gage for the lower end of the blank-strip, said gage being normally inoperative, and means controlled by the operator for moving said gage to its operative position.

14. The combination of the face-plate having the counter-forming dies, the presser-plates movable into said dies, the knife-carriage movable across said dies and having rolls to press the plates into the dies, and means for adjusting said rolls to the thickness of the counter-blank.

In testimony whereof we affix our signatures in presence of two witnesses.

EDWARD H. SAWIN.
BERTRAND T. PUTNAM.

Witnesses:
ROLLIN ABELL,
C. F. BROWN.